April 17, 1934.  T. J. LITLE, JR  1,954,937
INTERNAL COMBUSTION ENGINE
Filed Sept. 3, 1929
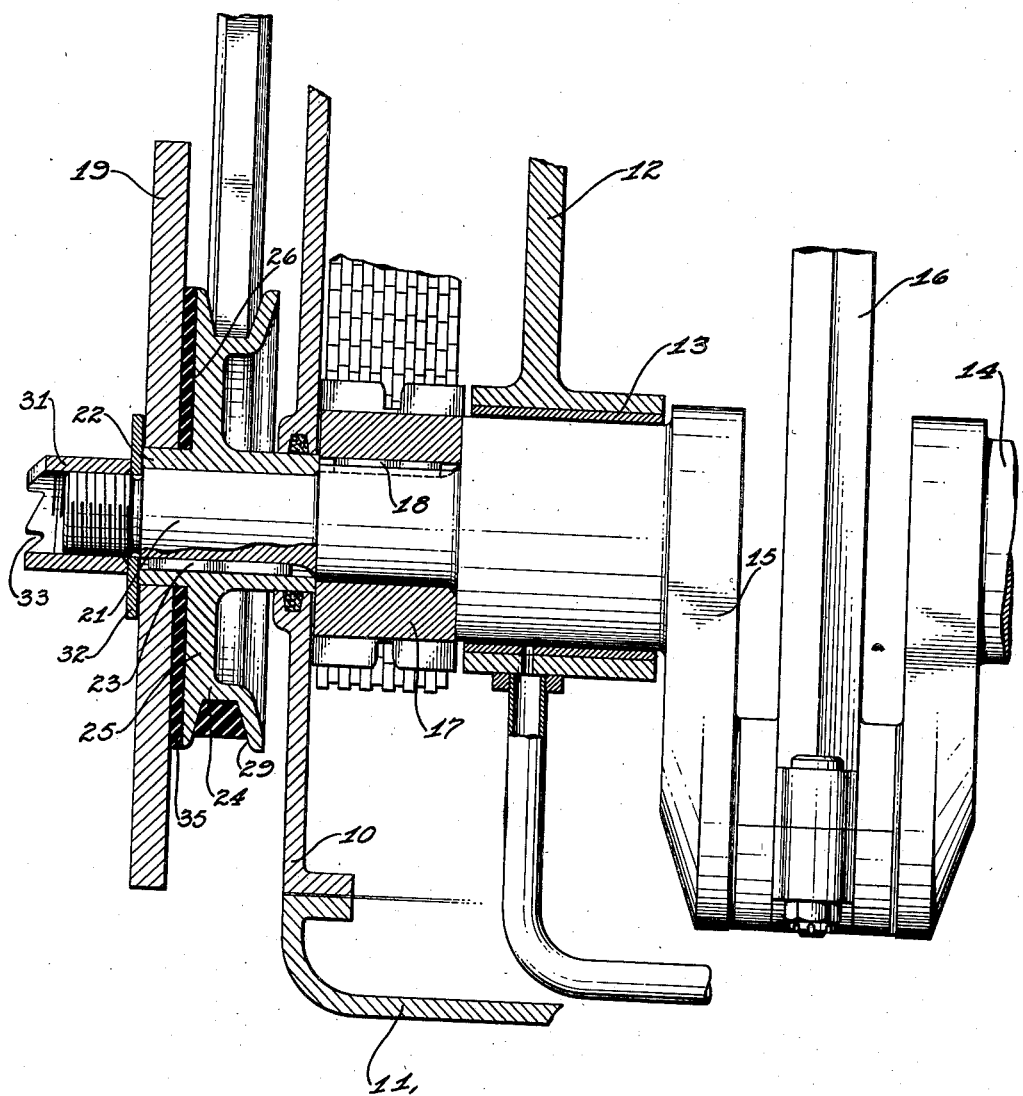
Inventor
THOMAS J. LITLE JR.

Patented Apr. 17, 1934

1,954,937

UNITED STATES PATENT OFFICE 1,954,937

INTERNAL COMBUSTION ENGINE

Thomas J. Litle, Jr., Indianapolis, Ind., assignor to Packard Motor Car Company, Detroit, Mich., a corporation of Michigan Application September 3, 1929, Serial No. 389,980

6 Claims. (Cl. 74—6)

This invention relates to internal combustion engines, and more particularly to means for controlling torsional vibration in the crankshafts of such engines.

It has for one of its objects to provide a simple and effective device, operable by internal friction, to damp torsional vibration in an engine shaft.

Another object of the invention is to provide a vibration damper having a deformable member, adapted to absorb energy by hysteresis or internal friction, which shall be permanently secured to the co-operating parts, and so formed and disposed as to provide a maximum of energy absorption.

Another object of the invention is to provide a vibration damper which shall occupy but little space axially of the shaft, having an energy absorbing member in the form of a thin disk which is subjected to torsional forces only.

Other objects of the invention will appear from the following description taken in connection with the drawing which forms a part of this specification and in which the single figure is a longitudinal vertical section through part of an internal combustion engine provided with a vibration damper constructed in accordance with this invention.

Referring to the drawing, at 10 is represented the crankcase of an internal combustion engine, having a lower cover or oil pan 11 and provided with transverse webs such as shown at 12. These webs support suitable aligned bearings 13 for an engine crankshaft 14, which has the usual integral cranks 15, each of which is connected by a connecting rod 16 to a piston mounted in one of the engine cylinders. The piston and cylinders are not shown in the drawing, but are of usual construction. The crankshaft is also provided with a gear or chain sprocket 17 which may be keyed or otherwise secured on the crankshaft as indicated at 18, and used to drive the engine cam shaft and other engine accessories, which are not shown in the drawing.

The damping means of this invention is illustrated as mounted at or adjacent the end of the crankshaft 14, which preferably projects through a suitable opening in the front wall of the crankcase 10. It is in the form of a cylindrical or disk shaped inertia member 19 mounted coaxially with the crankshaft on a suitable bearing part thereof. As shown, this bearing part of the crankshaft is a forwardly projecting reduced portion 21 on which a bearing or hub member 22 is keyed as indicated at 23. This bearing member 22, which may be a pulley 24 as illustrated, has an integral web member or flange 25 presenting a forwardly disposed surface 26 adapted for connection to the energy absorbing means to produce damping upon relative rotative movement.

The pulley 24 is provided with a peripheral groove 29 for cooperation with a suitable belt by which it may drive the engine fan and water pump or other engine accessories which are not shown in the drawing.

The inertia member 19 is journaled on a forwardly projecting bearing surface on the hub 22, and is provided with a retaining member 31 in the form of a nut threaded to the end of the shaft portion 21 and cooperating with a washer 32, having a slight clearance with the front face of the inertia member. The end of this member 31 may be formed with suitable teeth or lugs 33 for engagement with the usual hand starting crank for manually rotating the crankshaft for starting. Thus it will be seen that the inertia member 19 of this invention is coaxially mounted on the crankshaft and is adapted for relative rotation with respect thereto.

The damping or energy absorbing means of this invention comprises a resilient, deformable member 35, preferably of some imperfectly elastic material having considerable hysteresis or internal friction when subjected to cycles of deforming stress. The invention contemplates the use of rubber, rubberized fabric, or similar material, for this purpose, but it is to be understood that any suitable material having sufficient hysteresis to absorb the necessary amount of vibratory energy may be employed. This member 35 is preferably in the form of a thin disk surrounding the hub member 22 and disposed between the forward face on the flange 26 of the pulley 27 and the rear face of the cylindrical inertia member 19. It is rigidly and permanently secured to these cooperating faces in any suitable manner such as by cementing or otherwise sticking the adjacent surfaces together, but preferably by directly vulcanizing the rubber member to the members 19 and 24 by heat and pressure in the well known manner, thus forming a permanent assembly of the damper parts.

The operation of this device will be evident from the preceding description. During normal smooth running of the crankshaft 14, the disk 19 is driven from the crankshaft through the rubber member 35, without appreciable relative movement between these members. Upon the occurrence of a torsional vibration in the shaft, however, the member 19, by reason of its inertia, is unable to follow the rapid oscillatory movement of the shaft which is superposed on the steady forward rotation thereof. This produces a rapid oscillatory movement between the inertia member 19 and the hub member 23, which movement is resisted by torsional shearing stresses in the member 35. The resulting deformation absorbs vibratory energy from the system and converts it, by reason of its hysteresis losses, into heat. In this form it is dissipated from the system.

It will be evident that this device provides a simple and effective vibration damper, which by reason of the disposition and shape of the parts does not materially increase the necessary overall length of the engine crankshaft. It also provides an extremely simple structure which may be easily manufactured as an assembly at inconsiderable expense.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A vibration damper for engine shafts comprising a hub member rigidly secured to the shaft and having a flange presenting a radially disposed flat face, an inertia member journaled on said hub member having a flat face parallel to and opposite said flange face and spaced axially therefrom, and a radially disposed rubber disk vulcanized on one side to said flange face and on the other side to said hub member face.

2. A vibration damper for engine shafts comprising a hub member rigidly secured to the shaft having a flange presenting a radially disposed flat face, an inertia member mounted on said hub member for rotation about the crankshaft axis and having a flat face opposing and spaced axially from said flange face, and a rubber disk surrounding said hub member and permanently bonded at its faces with the faces of the inertia member and said flange.

3. A vibration damper for engine shafts comprising a hub member having an axially disposed bearing portion and a radially disposed flange, an inertia member journaled on said bearing portion, said flange and inertia member having opposed axially spaced flat faces, and spacing means comprising a deformable disk permanently bonded to the faces of said flange and said inertia member to absorb the energy of rotary movement therebetween.

4. A vibration damper for engine shafts comprising a hub member secured to the shaft and having a radially disposed flat face, an inertia member mounted on said hub member and having a radially disposed flat face spaced axially from the radially disposed face of the hub member, and a thin rubber disk interposed between and vulcanized to said radially disposed flat faces on said hub member and said inertia member.

5. A vibration damper for crankshafts comprising a hub member rigidly secured to the shaft and having a flange provided with a flat face of large area of considerable radial extent, an inertia member rotatable with respect to said hub member and having a flat face of large area of considerable radial extent located opposite to and axially spaced from the flange face, means including a relatively thin sheet of rubber of large surface area extending between the said faces and permanently bonded to the latter, said means comprising the sole driving connection between said members, said flange and said hub member having a direct connection for unitary rotation independent of said driving connection.

6. In a vibration damper for engine crankshafts, the combination of a hub having a disk connected thereto, said disk having a surface of large area and considerable radial extent, an inertia member having a similar surface opposite the disk surface and axially spaced therefrom, and a thin disk of rubber of large area permanently bonded to both said surfaces and forming a driving connection between them, said first named disk having its connection to the hub on that side of the rubber disk remote from the said surface of the inertia member.

THOMAS J. LITLE, Jr.